2,819,301

OXYALKYLATED DERIVATIVES OF NATURAL α-AMINO ACIDS

Louis T. Monson, Puente, and Woodrow J. Dickson, Monterey Park, Calif., assignors to Petrolite Corporation, Los Angeles, Calif., a corporation of Delaware No Drawing. Application February 5, 1954
Serial No. 408,578

8 Claims. (Cl. 260—518)

This invention relates to the preparation of substantially anhydrous and substantially undiluted oxyalkylated derivatives of a particular class of oxyalkylation-susceptible organic compounds which, because of certain characteristics they possess, are not otherwise oxyalkylatable to produce such derivatives.

Oxylakylation-susceptible organic compounds are characterized by their possession of labile hydrogen atoms, i. e., hydrogen atoms attached to oxygen, nitrogen, or sulfur. Their oxylation may proceed with greater or lesser readiness; but oxylkylated derivatives can be prepared from them.

The oxyalklating agents conventionally employed to produce oxyalkylated derivatives are the lower alkylene oxides, ethylene oxide, propylene oxide, butylene oxide, glycid, and methylglycid. These may be defined as alpha-beta alkylene oxides containing four carbon atoms or less. They may be employed singly, in sequence, or in admixture.

Unfortunately, there are some situations, like those with which this invention is concerned, in which the employment of such conventional oxyalkylating agents is not practicable. Some starting materials, although inherently oxyalkylation-susceptible, are solids which are substantially insoluble in any of the oxyalkylation-resistant solvents available for use in the preparation of oxyalkylated derivatives.

For example, many oxyalkylation-susceptible solids are insoluble in xylene, which is a frequently used solvent in oxyalkylation procedures. Xylene is oxyalkylation-resistant and is readily separable from the oxyalkylation mass by simple distillation.

Furthermore, even though such starting materials may be soluble in a few unusual oxyalkylation-resistant solvents, the latter are themselves comparatively non-volatile. Various ethers might in some cases be considered suitable solvents for the oxyalkylation-susceptible solid starting material. Such ethers, like the diethers of the polyglycols, in addition ot being expensive, are not susceptible to easy separation from the oxyalkylation mass by distillation. Hence, they are not readily recoverable from the oxyalkylation mass by distillation, to leave an undiluted oxyalkylated derivative.

Some solids which are oxyalkylation-susceptible are in fact most soluble in water; but water is not an acceptable solvent for use in oxyalkylation processes employing the conventionally used alkylene oxides because it reacts with such alkylene oxides to produce polyglycols, during oxyalkylation.

We are aware that it has been proposed in the past to conduct oxylakylations using the conventional alkylene oxides in aqueous solutions, presumably on the assumption that the oxide did not react wtih the water. However, it is now established that such reaction with the water occurs to some extent. The oxyalkylated mass produced in such aqueous systems therefore contains varying proportions of alkylene glycols as contaminants or adulterants. Our process avoids this difficulty because it is conducted under substantially anhydrous conditions in all cases. The starting solid material, the catalyst, and the alkylene carbonates employed by us are all used in substantially anhydrous form.

Furthermore, many oxyalkylation-susceptible solids cannot be used in undiluted form in an oxyalkylation process using the alkylene oxides, and simply liquefied by heating prior to introduction of the oxyalkylating agent, because they undergo partial decomposition as they melt. If maintained at the temperature at which fusion just begins to be apparent, for a time such as 15 minutes, they undergo at least partial decomposition. If they exhibit such behavior in the presence of an oxyalkylation catalyst, like the alkali carbonates, they come within our class of suitable starting materials for use in our present process.

The forgoing statement of difficulties is applicable to greater or lesser extent to a number of oxyalkylation-susceptible compounds, including those recited below. The alkylene oxides are not usable for their oxyalkylation for the above stated reasons.

Our present invention overcomes such difficulties and permits oxyalkylation of such materials to be accomplished by simple and inexpensive means. Thus, we employ as primary oxyalkylating agents the carbonates which are the counterparts of the foregoing alkylene oxides, viz., ethylene carbonate, propylene carbonate, butylene carbonate, hydroxypropylene carbonate, and hydroxybutylene carbonate. Of these, only ethylene carbonate and propylene carbonate are currently in commercial production, although the others will doubtless achieve similar commercial status in time.

More specifically, our invention relates to a process for preparing substantially anhydrous, substantially undiluted, oxyalkylated derivatives of an anhydrous, solid, oxyalkylation-susceptible, natural alpha-amino-acid, which solid suffers at least partial decomposition if maintained at its beginning-of-fusion temperature for a period of at least 15 minutes in the presence of an oxyalkylation catalyst, and which solid is insoluble in oxyalkylation-resistant, readily-distillable solvents; which derivatives are obtained by reacting said solid with at least one alkylene carbonate selected from the class consisting of ethylene carbonate, propylene carbonate, butylene carbonate, hydroxypropylene carbonate, and hydroxybutylene carbonate, in presence of an oxyalkylation catalyst; the proportion of alkylene carbonate employed being sufficient to yield a product which is at least liquefiable at the tempertature required to effect its subsequent oxyalkylation using at least one alkylene oxide selected from the class consisting of ethylene oxide, propylene oxide, butylene oxide, glycyid, and methylglycid.

Our invention includes the products so prepared.

In its narrower scope and more important aspect, our invention relates to a two-step process for preparing substantially anhydrous, substantially undiluted oxyalkylated derivatives from an anhydrous, solid, oxyalkylation-susceptible natural alpha-amino-acid, which solid suffers at least partial decomposition if maintained at its beginning-of-fusion temperature for a period of at least 15 minutes in the presence of an oxyalkylation catalyst, and which solid is insoluble in oxyalkylation-resistant, readily-distillable solvents; which process consists in: (A) first reacting said solid with at least one alkylene carbonate selected from the class consisting of ethylene carbonate, propylene carbonate, butylene carbonate, hydroxypropylene carbonate, and hydroxybutylene carbonate, in presence of an oxyalkylation catalyst; the proportion of alkylene carbonate employed being sufficient to yield a product which is at least liquefiable at the temperature required to effect its subsequent oxyalkylation using at least one alkylene oxide selected from the class consisting of ethylene oxide, propylene oxide, butylene oxide, glycid, and methylglycid; and (B) subsequently reacting such partially oxyalkylated derivative with at least one member selected from the aforesaid class of alkylene oxides.

Our invention also includes the products so prepared.

Briefly described, our broad process is practiced by introducing into a suitable processing vessel the solid, oxyalkylation-susceptible natural alpha-amino-acid, preferably in finely divided form; the desired or required proportion of alkylene carbonate; and a minor proportion of an alkaline catalyst such as an alkali carbonate. The mixture is warmed, preferably with stirring. As the temperature reaches a certain critical level, usually somewhat above 100° C., there is a vigorous effervescence in which carbon dioxide is liberated, and the oxyalkylated derivative is formed.

It is sometimes desirable to modify this general procedure in various minor ways. For example, the alkylene carbonate is introduced into a vessel and warmed until liquid. The catalyst is added. The solid, oxyalkylation-susceptible natural alpha-amino-acid material is then slowly introduced in finely divided form, with stirring, and the temperature is slowly raised to the reaction point. Such procedural variation is useful where the oxyalkylation-susceptibility of the starting material is not great and where use of the first-described procedure above would produce a solid mass in the vessel which could not be readily handled thereafter.

In the two-step embodiment of our process, we usually employ only enough alkylene carbonate in the first step to produce a liquid or readily liquefiable derivative, which contains a relatively small proportion of oxyalkylene radicals. We then continue oxyalkylation using the conventional alkylene oxides. Stated another way, this two-step process is employed to produce, first, intermediates; then more highly oxyalkylated products are prepared in the second step using the more economical, conventional alkylene oxides. This two-step process is the more important aspect of our invention.

In the appended claims, we have specified that the intermediate product prepared in the first step of the two-step process shall be a liquid or at least liquefiable at the temperature required to effect the oxyalkylation by use of the alkylene oxides in the second step of our two-step process. Said second step is conducted at conventional oxyalkylation temperatures, usually between about 100° C. and 200° C.

One incidental advantage of using the alkylene carbonates for oxyalkylation is that they are relatively inert materials as compared with the alkylene oxides. Their use therefore entails smaller hazards. Oxyalkylations using them are conducted with greater safety than if the alkylene oxides were employed. Processing vessels are usually not required to be pressure-resistant when the alkylene carbonates are employed, whereas ethylene oxide and propylene oxide, for example, are required to be employed in pressure vessels because of their physical properties.

All oxyalkylation-susceptible natural alpha-amino-acid starting materials do not react with equal readiness with the alkylene carbonates in our process. For example, where steric or other obscure influences are adverse, oxyalkylation may proceed at extremely slow rates.

The temperature at which the oxyalkylation reaction will occur, using the alkylene carbonates, must be expected to vary somewhat with the choice of natural alpha-amino-acid starting material and alkylene carbonate. In all cases, the proper technique to be initially employed is to advance the temperature cautiously and so to determine the minimum temperature required to effect reaction. This procedure requires no especial skill and no experimentation, in that the vigorous effervescence resulting from the liberation of carbon dioxide in the reaction is ready evidence of such reaction. As stated above, the reaction usually requires a temperature somewhat above 100° C. The maximum feasible oxyalkylation temperature is of course the decomposition temperature for the mixture of solid starting material, catalyst, and alkylene carbonate, and above which temperature pyrolysis of the starting material, polymerization of the alkylene carbonate, or other undesired reaction begins to occur.

The oxyalkylation catalysts employed by us are usually the alkali carbonates such as sodium or potassium carbonate, in substantially anhydrous form.

The finished oxyalkylated product will of course contain such inorganic catalyst. The catalyst will usually separate readily from the oxyalkylated mass on standing, especially if slightly warm. Since the residual proportions of catalyst in the supernatant product are usually of very small magnitude after such settling, we consider they do not materially dilute or contaminate our finished products.

In some instances, solid, oxyalkylation-susceptible substances, which may have been stated in the literature to have definite melting points, are nevertheless susceptible to progressive decomposiiton if maintained at or about the temperature at which they begin to fuse, for any period of time. Some such substances similarly undergo progressive deterioration if subjected to such temperatures in the presence of an alkaline material, like an oxyalkylation catalyst, for any period of time. Natural alpha-amino-acids which, although they may have recorded definite melting points, are unstable under oxyalkylating conditions as described, are included among our usable starting materials.

We have therefore limited our usable natural alpha-amino-acid starting materials to those which suffer at least partial decomposition if maintained at their beginning-of-fusion temperature for a period of at least 15 minutes in the presence of an oxyalkylation catalyst. Additionally, such solid natural alpha-amino-acid starting material must be insoluble in oxyalkylation-resistant, readily-distillable solvents, as already stated.

As the molecular weight of the alkylene carbonate rises, its reactivity with the natural alpha-amino-acid starting materials is reduced. Since, for example, ethylene carbonate is more reactive than propylene carbonate, and propylene carbonate is more reactive than butylene carbonate, there may be marked differences in the speed of oxyalkylation when different alkylene carbonates are used. In marginal cases, it will be understood, a natural alpha-amino-acid starting material may be oxyalkylation-susceptible in the sense that it is readily reactive toward ethylene carbonate or propylene carbonate, but it may be rather insensitive toward butylene carbonate.

Our broad process may be practiced using more than one alkylene carbonate, and our two-step process may be practiced using, in addition, more than one alkylene oxide, to produce mixed oxyalkylated derivatives. In such cases, the alkylene carbonates may be employed in sequence or they may be employed as a mixture, as desired. The same is true of the alkylene oxides employed in our two-step process, which may be used in sequence or as a mixture.

Amino-acids may be termed the building-blocks from which the proteins are formed. Certain amino-acids may be obtained from the proteins by suitable degradation processes. Other alpha-amino-acids have not actually been isolated from proteins but have been isolated from some biological material. All of these alpha-amino acids, however, are normally classified in the chemical art as "natural amino-acids" and this definition is employed in the instant specification and claims to define the class of starting materials useful in producing the compositions of our invention. We do not require that our amino-acid starting material must actually have been derived from a natural source. For example, methionine is one of the protein-derivable amino-acids we employ as a starting material to produce our compositions. We employed synthetic dl-methionine satisfactorily in our experiments which resulted in our present invention. Similarly, lysine is produced synthetically on a commercial scale; and such synthetic lysine is as suitable for use as a starting material here as is the natural product derived from a protein source.

Natural alpha-amino-acids included in our present class of starting materials are glycine, alanine, serine, cysteine, cystine, aminobutyric acid, valine, methionine, leucine, norleucine, isoleucine, b-phenylalanine, tyrosine, diiodotyrosine, proline, hydroxyproline, tryptophane, asparagine, aspartic acid, glutamic acid, arginine, lysine, and histidine, among others. In addition, such compounds as djenkolic acid, threonine, ethionine, norvaline, citrulline, dihydroxyphenylalanine, hydroxyglutamic acid, dibromotyrosine, hydroxylysine, canavanine, canaline, ornithine, thyroxine, thiolhistidine are likewise suitable starting materials here.

The foregoing compounds are reported in the literature to melt with decomposition at temperatures above 200° C. and in some cases above 300° C. They are insoluble in oxyalkylation-resistant solvents like xylene, and they are all oxyalkylation-susceptible.

Some of the amino-acids are of significant economic importance. For example, methionine is used in poultry-feed supplements. Glutamic acid is used as its monosodium salt as a food flavoring material. Most refined amino-acids find their use in medicine and in biochemical research. Tryptophane appears to have important utility in the feeding of swine. Lysine similarly is useful as a supplement of livestock feeds. Cottonseed meal, barley, and sesame meal are all deficient in lysine. Soybean meal is deficient in methionine. Meat bone scrap, used in animal feeds, is deficient in tryptophane; and milo is deficient in all three amino-acids. The future use of such materials will undoubtedly extend into the field of human nutrition, because many staple foodstuffs are deficient in one or more of them.

Commercially, glutamic acid is obtained from sugar beet liquor; tryptophane, from gelatin; histidine, from blood meal; tyrosine, from a dairy waste.

Since the l-isomers are biologically the more active, we prefer to employ them rather than the d-isomers or the racemic or dl-mixtures. However, we also include such d- and dl-forms as useful starting materials for our process.

As examples of our process, in which the foregoing starting materials are usable, the following are typical but not exclusive.

In all cases, the apparatus employed to produce the products in the laboratory was a conventional resin pot assembly, fitted with a stirrer. This is a glass apparatus comprising a lower bowl or vessel, and an upper cap section containing several outlets, for the stirrer shaft, a thermometer, and a reflux condenser, and a charge hole fitted with a stopper. The design is conventional and need not be described further. Heat is supplied by a glass-textile heating mantle which fits the lower portion of the assembly, and which is regulated by inclusion of a rheostat in the electrical circuit. Such devices are likewise wholly conventional, and require no description here. Motor-driven stirrers, of the kind here used, and having stainless-steel or glass shafts and paddles, are likewise conventional laboratory equipment.

*Example 1*

We charged into a glass resin pot assembly 131 grams of l-leucine, 264 grams of ethylene carbonate, and 6 grams of powdered potassium carbonate. The mixture was heated cautiously, with stirring, to a temperature of about 165–175° C., at which point evolution of carbon dioxide began. The mixture was stirred for a total of 6 hours, the maximum temperature being 195° C. The product was a viscous, brown liquid.

*Example 2*

We have repeated Example 1, using l-leucine, but substituting for the ethylene carbonate there used 306 grams of propylene carbonate, and continuing the reaction for 8 hours. Otherwise the procedure was the same as in Example 1. The product was a viscous, brown liquid.

*Example 3*

We have repeated Example 1, using l-leucine, but substituting for the ethylene carbonate there used a mixture of 132 grams of ethylene carbonate and 153 grams of propylene carbonate. The procedure was otherwise the same as in Example 1, except that the time of reaction was 8 hours. The product was a viscous, brown liquid.

*Example 4*

We have repeated Example 1, using l-leucine, but substituting for the ethylene carbonate there used 348 grams of butylene carbonate, and continuing the reaction for 10 hours. The conditions were otherwise the same as those of Example 1. The product was a viscous, brown liquid.

*Example 5*

We have repeated Example 1, using l-leucine, but substituting for the ethylene carbonate there used 354 grams of hydroxypropylene carbonate, and continuing the reaction for 8 hours. The conditions otherwise were the same as those of Example 1. The product was a viscous, brown liquid.

*Example 6*

We have repeated Example 1, using l-leucine, but substituting for the ethylene carbonate there used 396 grams of hydroxybutylene carbonate, and continuing the reaction for 10 hours. The conditions otherwise were the same as those of Example 1. The product was a viscous, brown liquid.

*Example 7*

We have repeated Example 1. Then, after transferring the reaction mass to a conventional oxyalkylating autoclave, adding 5 grams of sodium hydroxide, and heating to 165° C., we have introduced into the mass, with stirring, 132 grams of ethylene oxide. The pressure did not exceed about 50 p. s. i.; and the procedure consumed 3 hours. The product was a dark, viscous liquid.

*Example 8*

We have repeated Example 7, except that we have substituted for the ethylene oxide there used 174 grams of propylene oxide, and have maintained the temperature during the second oxyalkylating step at about 125° C. Maximum pressure was about 30 p. s. i. The second step consumed 5 hours. The product was a dark, viscous liquid.

*Example 9*

We have repeated Example 7, except that, after introducing the ethylene oxide, we have introduced 348 grams of propylene oxide, at about 125° C. The time required to introduce this propylene oxide was 7 hours. Maximum pressure was about 30 p. s. i. The product was a dark, viscous liquid.

*Example 10*

We have repeated Example 3. Then, after transferring the reaction mass to a conventional oxyalkylating autoclave, adding 5 grams of sodium hydroxide, and heating to about 140° C., we have introduced into the mass, with stirring, a mixture of 132 grams of ethylene oxide and 174 grams of propylene oxide. The second oxyalkylation step consumed 8 hours. Maximum pressure was about 40 p. s. i. The product was a viscous, dark liquid.

Example 11

We have repeated Example 1, but substituting for the l-leucine there used 149 grams of methionine. Conditions otherwise were the same as those of Example 1. The product was a viscous, brown liquid.

Example 12

We have repeated Example 1, but substituting for the l-leucine there used 146 grams of l-lysine. Conditions otherwise were the same as those of Example 1. The product was a viscous, brown liquid.

Example 13

We have repeated Example 1, but substituting for the l-leumine there used 204 grams of l-tryptophane. Conditions otherwise were the same as those Example 1. The product was a viscous, brown liquid.

Example 14

We have repeated Example 1, but substituting for the l-leucine there used 147 grams of glutamic acid. Conditions otherwise were the same as those of Example 1. The product was a viscous, brown liquid.

Example 15

We have repeated Example 1, but substituting for the l-leucine there used 181 grams of l-tyrosine. Conditions otherwise were the same as those of Example 1. The product was a viscous, brown liquid.

Some of our amino-acid starting materials are basic; some are acidic; some are substantially neutral in reaction. In such instances where the starting material is acidic, it is preferably used at least partially in the form of a salt, e. g., an alkali salt such as may be produced in situ by adding enough of the alkaline catalyst to leave the mixture slightly alkaline. Where the starting material is acidic, at least sufficient alkali carbonate is preferably used to neutralize such acidity. Thereafter, a small additional amount of alkali carbonate is usually desirably included to accelerate the oxyalkylation process. However, in some instances, the alkali-neutralized starting material is sufficiently alkaline to supply the desired catalytic influence, without addition of further amounts of alkali carbonate.

We believe the products obtained by practising the above-described novel preparative procedures are themselves new and novel, and we claim them as new compositions of matter, hereinafter.

The products of our processes find a number of uses. In general, they are the same uses as those to which the amino-acid starting materials are put, as described above. An important asset that our products possess over our starting materials is that, as oxyalkylation levels are increased, the products become surface-active. In such form, they combine the benefits of the amino-acids as diet supplements with the recently-discovered benefits derived from the inclusion of surface-active materials in feed stocks. It is not known how surface-active agents improve the response of animals and fowls to their food, but the discovery that this is the fact is leading stock-feed and poultry-feed manufacturers to incorporate into their products a small proportion of some surface-active agent for this purpose. Our oxyalkylated amino-acid derivatives have such surface-active properties built into their molecules.

This application is a continuation-in-part of our co-pending application, Serial No. 359,666, filed June 4, 1953, now abandoned.

We claim:

1. Substantially anhydrous, substantially undiluted, oxyalkylated derivatives of an anhydrous, solid, oxyalkylation-susceptible, natural alpha amino acid, which solid suffers at least partial decomposition if maintained at its beginning-of-fusion temperature for a period of at least 15 minutes in the presence of an oxyalkylation catalyst, and which solid is insoluble in oxyalkylation-resistant, readily-distillable solvents; which derivatives are obtained by reacting said solid with at least one alkylene carbonate selected from the class consisting of ethylene carbonate, propylene carbonate, butylene carbonate, hydroxypropylene carbonate, and hydroxybutylene carbonate, in presence of an oxyalkylation catalyst; the proportion of alkylene carbonate employed being sufficient to yield a product which is liquid at the temperature required to effect its subsequent oxyalkylation using at least one alkylene oxide selected from the class consisting of ethylene oxide, propylene oxide, butylene oxide, glycid, and methylglycid.

2. The products of claim 1, prepared from alkylene carbonates characterized by possessing at least 2 and not more than 3 carbon atoms and being free from hydroxyl groups.

3. The products of claim 1, prepared from: (A) alkylene carbonates characterized by possessing at least 2 and not more than 3 carbon atoms and being free from hydroxyl groups, and (B) leucine.

4. The products of claim 1, prepared from: (A) alkylene carbonates characterized by possessing at least 2 and not more than 3 carbon atoms and being free from hydroxyl groups, and (B) tyrosine.

5. The products of claim 1, prepared from: (A) alkylene carbonates characterized by possessing at least 2 and not more than 3 carbon atoms and being free from hydroxyl groups, and (B) methionine.

6. The products of claim 1, prepared from: (A) alkylene carbonates characterized by possessing at least 2 and not more than 3 carbon atoms and being free from hydroxyl groups, and (B) lysine.

7. Substantially anhydrous, substantially undiluted, oxyalkylated derivatives of an anhydrous, solid, oxyalkylation-susceptible, natural alpha amino acid, which solid suffers at least partial decomposition if maintained at its beginning-of-fusion temperature for a period of at least 15 minutes in the presence of an oxyalkylation catalyst, and which solid is insoluble in oxyalkylation-resistant, readily-distillable solvents; which derivatives are obtained by: (A) first reacting said solid with at least one alkylene carbonate selected from the class consisting of ethylene carbonate, propylene carbonate, butylene carbonate, hydroxypropylene carbonate, and hydroxybutylene carbonate, in presence of an oxyalkylation catalyst; the proportion of alkylene carbonate employed being sufficient to yield a product which is liquid at the temperature required to effect its subsequent oxyalkylation using at least one alkylene oxide selected from the class consisting of ethylene oxide, propylene oxide, butylene oxide, glycid, and methylglycid; and (B) subsequently reacting such partially oxyalkylated derivative with at least one member selected from the aforesaid class of alkylene oxides.

8. The products of claim 7, prepared from alkylene carbonates and alkylene oxides respectively characterized by possessing at least 2 and not more than 3 carbon atoms and being free from hydroxyl groups.

References Cited in the file of this patent

UNITED STATES PATENTS

| | | |
|---|---|---|
| 2,233,382 | De Groote et al. | Feb. 25, 1941 |
| 2,448,767 | Carlson | Sept. 7, 1948 |
| 2,561,468 | Guest | July 24, 1951 |
| 2,714,609 | Matter | Aug. 2, 1955 |
| 2,766,292 | Monson et al. | Oct. 9, 1956 |